United States Patent
Arndt et al.

(10) Patent No.: US 7,647,437 B2
(45) Date of Patent: *Jan. 12, 2010

(54) MOVING, RESIZING, AND MEMORY MANAGEMENT FOR PRODUCER-CONSUMER QUEUES BY CONSUMING AND STORING ANY QUEUE ENTRIES FROM AN OLD QUEUE BEFORE ENTRIES FROM A NEW QUEUE

(75) Inventors: Richard L. Arndt, Austin, TX (US); David F. Craddock, New Paltz, NY (US); Ronald E. Fuhs, Rochester, MN (US); Thomas A. Gregg, Highland, NY (US); Thomas Schlipf, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/028,905

(22) Filed: Feb. 11, 2008

(65) Prior Publication Data

US 2008/0148008 A1    Jun. 19, 2008

Related U.S. Application Data

(62) Division of application No. 10/977,632, filed on Oct. 29, 2004, now Pat. No. 7,356,625.

(51) Int. Cl.
*G06F 5/00* (2006.01)
*G06F 13/00* (2006.01)

(52) U.S. Cl. .............................. 710/52; 710/32; 710/53; 710/56; 709/231; 370/381; 370/395.5

(58) Field of Classification Search .................. 710/32, 710/52, 53, 56; 709/231; 370/395.5, 381
See application file for complete search history.

(56) References Cited

U.S. PATENT DOCUMENTS

| 5,961,651 A | 10/1999 | Gittins et al. |
| 5,966,547 A | 10/1999 | Hagan et al. |
| 6,145,061 A | 11/2000 | Garcia et al. |
| 6,229,813 B1 | 5/2001 | Buchko et al. |
| 6,542,950 B1 | 4/2003 | Bodnar |
| 6,654,811 B1 * | 11/2003 | Chaskar et al. ............. 709/236 |
| 2003/0058875 A1 | 3/2003 | Arndt et al. |
| 2004/0205217 A1 | 10/2004 | Gabrani et al. |
| 2004/0218592 A1 | 11/2004 | Nagar et al. |

* cited by examiner

*Primary Examiner*—Tammara Peyton
(74) *Attorney, Agent, or Firm*—Cantor Colburn LLP; Arthur Ortega (57) ABSTRACT

Systems, methods, and software products for moving and/or resizing a producer-consumer queue in memory without stopping all activity is provided so that no data is lost or accidentally duplicated during the move. There is a software consumer and a hardware producer, such as a host channel adapter.

2 Claims, 8 Drawing Sheets

MOVING, RESIZING, AND MEMORY MANAGEMENT FOR PRODUCER-CONSUMER QUEUES BY CONSUMING AND STORING ANY QUEUE ENTRIES FROM AN OLD QUEUE BEFORE ENTRIES FROM A NEW QUEUE

CROSS TO RELATED APPLICATION

This application is a divisional application of U.S. Ser. No. 10/977,632 filed Oct. 29, 2004, the disclosure of which is incorporated by reference herein in its entirety.

BACKGROUND OF THE INVENTION

1. Field of the Invention

In general, the present invention relates to computer architecture, processor architecture, operating systems, input/output (I/O), concurrent processes, and queues. In particular, the present invention relates to moving, resizing, and memory management for producer-consumer queues.

2. Description of Related Art

The InfiniBand™ Architecture Specification is a standard that is available from the InfiniBand® Trade Association that defines a single unified I/O fabric. An overview of the InfiniBand™ architecture (IBA) is shown in FIG. 1.

Figure 1:
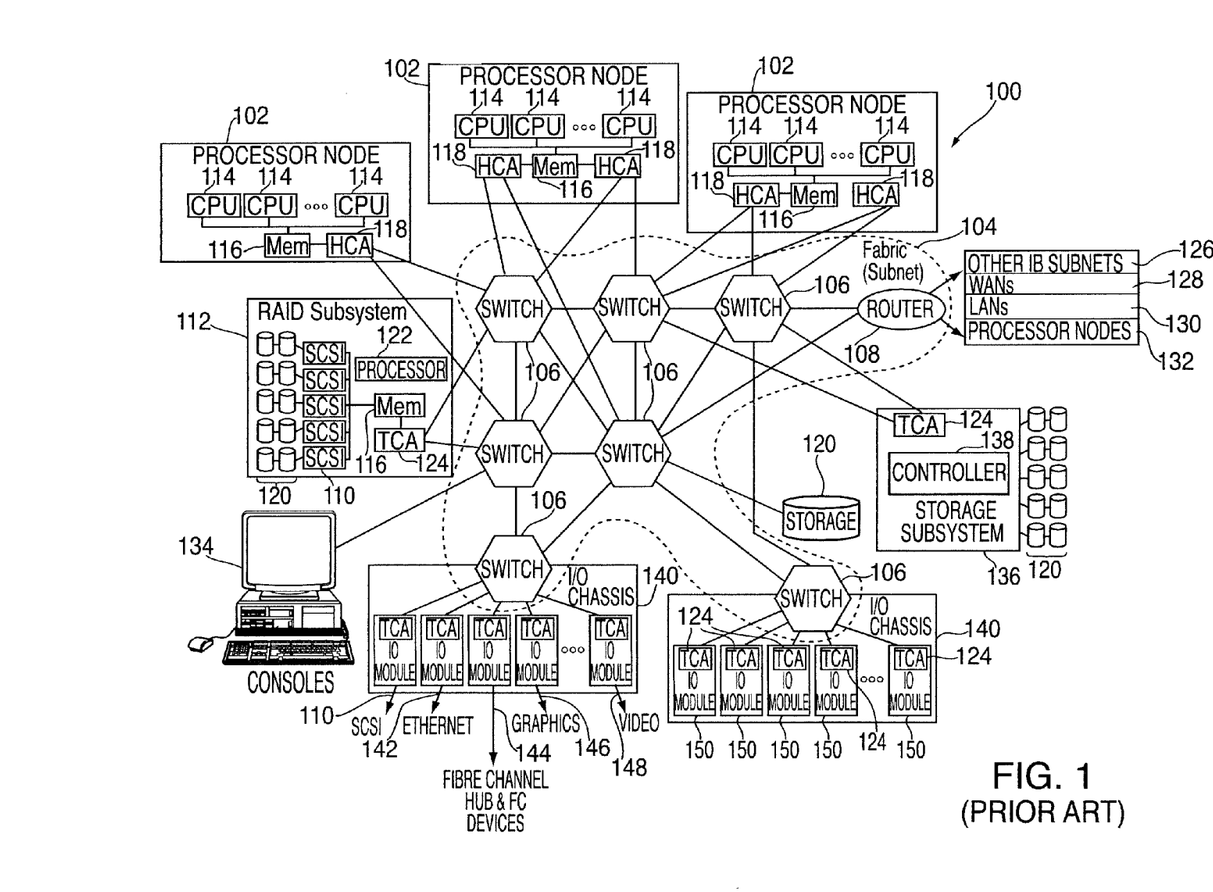
FIG. 1 is a block diagram showing an overview of the prior art InfiniBand™ architecture (IBA)

As shown in FIG. 1, IBA defines a System Area Network (SAN) 100 for connecting multiple independent processor platforms, i.e., host processor nodes 102, I/O platforms, and I/O devices. The IBA SAN 100 is a communications and management infrastructure supporting both I/O and interprocessor communications (IPC) for one or more computer systems. An IBA system can range from a small server with one processor and a few I/O devices to a massively parallel supercomputer installation with hundreds of processors and thousands of I/O devices. Furthermore, the internet protocol (IP) friendly nature of IBA allows bridging to an internet, intranet, or connection to remote computer systems.

IBA defines a switched communications fabric 104 allowing many devices to concurrently communicate with high bandwidth and low latency in a protected, remotely managed environment. An end node can communicate over multiple IBA ports and can utilize multiple paths through the IBA fabric 104. The multiplicity of IBA ports and paths through the network are exploited for both fault tolerance and increased data transfer bandwidth.

IBA hardware offloads from the CPU much of the I/O communications operation. This allows multiple concurrent communications without the traditional overhead associated with communicating protocols. The IBA SAN 100 provides its I/O and IPC clients zero processor-copy data transfers, with no kernel involvement, and uses hardware to provide highly reliable, fault tolerant communications. An IBA SAN 100 consists of processor nodes 102 and I/O units connected through an IBA fabric 104 made up of cascaded switches 106 and routers 108. I/O units can range in complexity from single application-specific integrated circuit (ASIC) IBA attached devices such as a small computer system interface (SCSI) 110 or LAN adapter to large memory rich redundant array of independent disks (RAID) subsystems 112 that rival a processor node 102 in complexity.

In the example in FIG. 1, each processor node 102 includes central processor units (CPUs) 114, memory 116, and Host Channel Adapters (HCAs) 118. The RAID subsystem 112 includes storage 120, SCSIs 110, a processor 122, memory 116, and a Target Channel Adapter (TCA) 124. The fabric 104 is in communication with other IB subnets 126, wide area networks (WANs) 128, local area networks (LANs) 130, and processor nodes 132 via a router 108. The fabric provides access to a console 134, a storage subsystem 136 having a controller 138 and storage 120, and I/O chassis 140. One I/O chassis 140 include SCSI 110, Ethernet 142, fibre channel (FC) hub and FC devices 144, graphics 146, and video 148. Another I/O chassis 140 includes a number of I/O modules 150 having TCAs 124.

Figure 2:
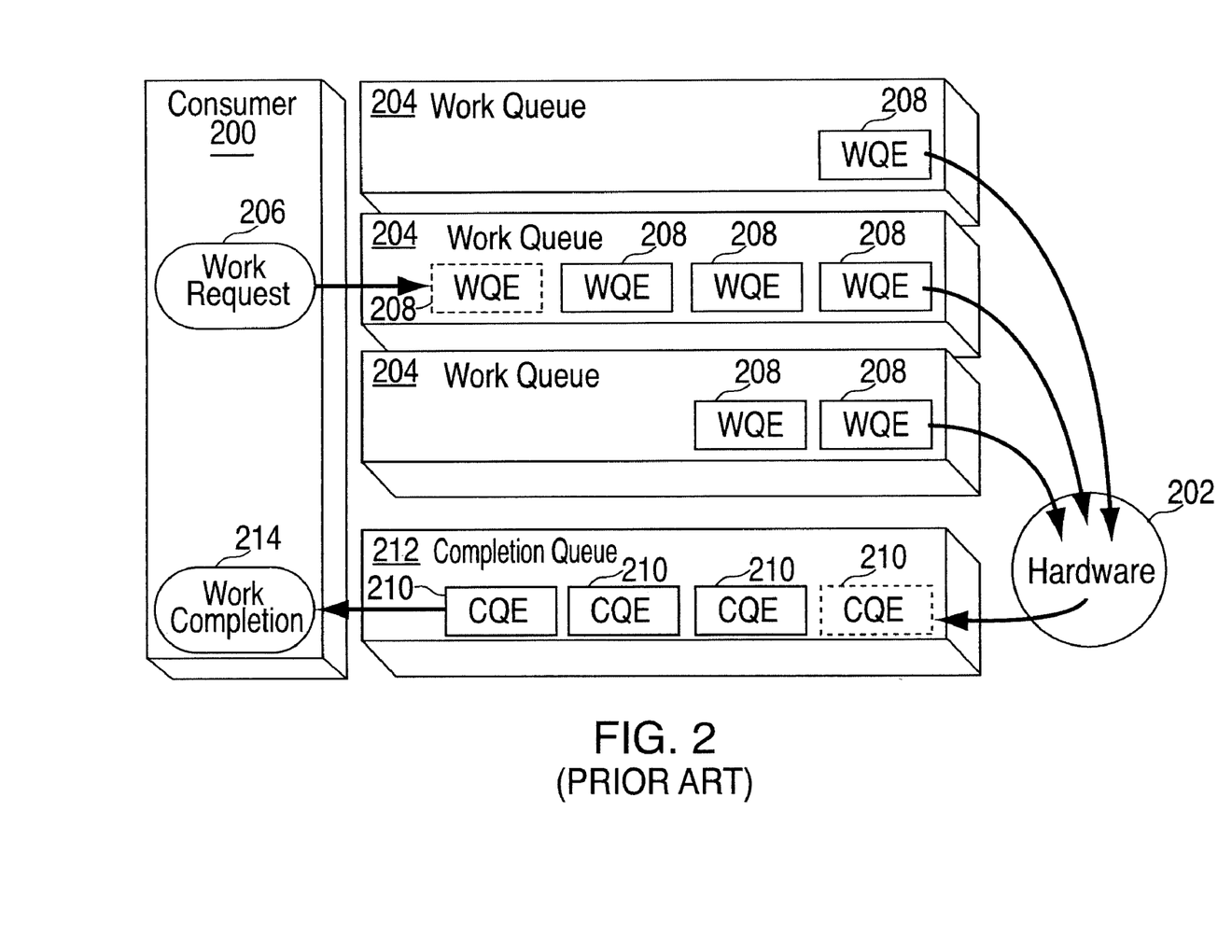
FIG. 2 is a block diagram of a consumer queuing model in the prior art IBA.

FIG. 2 shows a consumer queuing model in the standard. The foundation of IBA operation is the ability of a consumer 200 to queue up a set of instructions executed by hardware 202, such as an HCA. This facility is referred to as a work queue 204. Work queues 204 are always created in pairs, called a Queue Pair (QP), one for send operations and one for receive operations. In general, the send work queue holds instructions that cause data to be transferred between the consumer's memory and another consumer's memory, and the receive work queue holds instructions about where to place data that is received from another consumer. The other consumer is referred to as a remote consumer even though it might be located on the same node.

The consumer 200 submits a work request (WR) 206, which causes an instruction called a Work Queue Element (WQE) 208 to be placed on the appropriate work queue 204. The hardware 202 executes WQEs 208 in the order that they were placed on the work queue 204. When the hardware 202 completes a WQE 208, a Completion Queue Element (CQE) 210 is placed on a completion queue 212. Each CQE 210 specifies all the information necessary for a work completion 214, and either contains that information directly or points to other structures, for example, the associated WQE 208, that contain the information. Each consumer 200 may have its own set of work queues 204, each pair of work queues 204 is independent from the others. Each consumer 200 creates one or more Completion Queues (CQs) 212 and associates each send and receive queue to a particular completion queue 212. It is not necessary that both the send and receive queue of a work queue pair use the same completion queue 212. Because some work queues 204 require an acknowledgment from the remote node and some WQEs 208 use multiple packets to transfer the data, the hardware 202 can have multiple WQEs 208 in progress at the same time, even from the same work queue 204. CQs 212 inform a consumer 200 when a work request 206 has completed.

Event Queues (EQs) can be used to inform the consumer 200 of numerous conditions such as posting completion events, state change events, and error events that are defined in the standard. There is a need for event queues (EQs) for events that are defined in the standard. The CQs 212 and EQs need to be resized to be made larger or smaller than the original size, while WQEs 208 are outstanding and the number of resources (e.g., queue pairs (QPs), memory regions, CQs 212, physical ports) referencing the queues is changing. Additionally, there is a need to support logical partition (LPAR) memory reconfiguration and node evacuation for concurrent node replacement and repair. A logical partition (LPAR) is the division of a computer's processors, memory, and storage into multiple sets of resources so that each set of resources can be operated independently with its own operating system instance and applications.

There are many applications for producer-consumer queues, including video streaming and banking applications, such as automatic teller machines (ATMs). In video streaming applications, the producer is putting portions of video on the queue for the consumer to read and display. For ATM applications, the producer is putting transactions on the queue for the consumer (bank) to process and apply to an account. In an on demand environment, it may be desirable to move and/or resize the queue without stopping all activity, when, for example, workload balancing or workload management requires it. It is important that no data is lost or accidentally repeated during a move and/or resize operation, resulting in, for example, repeating or skipping portions of video or losing or double counting ATM transactions. Traditionally, all activity is stopped for producer-consumer queues for move and/or resize operations. However, for an on demand business that is working 24/7 and "always on", this may not be acceptable.

SUMMARY OF THE INVENTION

There are various aspects of the present invention, which includes systems, methods, and software products for moving and/or resizing producer-consumer queues.

One aspect is a method for moving a queue. A pointer is stored in a hardware producer that points to a location of a new queue in a memory. It is determined whether the hardware producer is storing an entry to an old queue. If the hardware producer is storing the entry to the old queue, the method waits for the hardware producer to finish. Any entries on the old queue are consumed before consuming any entries on the new queue.

Another aspect is a storage device holding instructions for performing a method for moving a queue. The instructions are executable by a processor. A pointer is stored in a hardware producer that points to the location of a new queue in a memory. It is determined whether the hardware producer is storing an entry to an old queue. If the hardware producer is storing the entry to the old queue, the method waits for the hardware producer to finish. Any entries on the old queue are consumed before consuming any entries on the new queue. The new queue may be of a different size than the old queue.

Another aspect is a method for moving a queue. A queue page table pointer to a hardware producer is stored. The queue page table pointer points to the location of a new queue. The current state of the hardware producer is determined. If the current state is a final state, the hardware producer finishes storing a queue event in an old queue and the current state transitions to a second state having a ready condition, an invalid queue tail pointer, and a valid queue page table pointer. The valid queue page table pointer is the queue page table pointer that points to the location of the new queue.

Another aspect is a system for moving a queue that includes a software consumer, a hardware producer, and an input/output (I/O) interface. The software consumer consumes any queue entries from an old queue before consuming any queue entries from a new queue. The hardware producer finishes storing any queue entry being stored to the old queue, before starting to store any queue entries to new queue, after receiving a pointer pointing to the location of the new queue in a register. The I/O interface stores the pointer to the register in the hardware producer.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE INVENTION

The present invention includes systems, methods, and computer-readable mediums for moving, resizing, and memory management for producer-consumer queues. Embodiments of the present invention may be practiced with InfiniBand™ compliant systems, or any other system where moving, resizing, and memory management for producer-consumer queues is needed.

Figure 3:
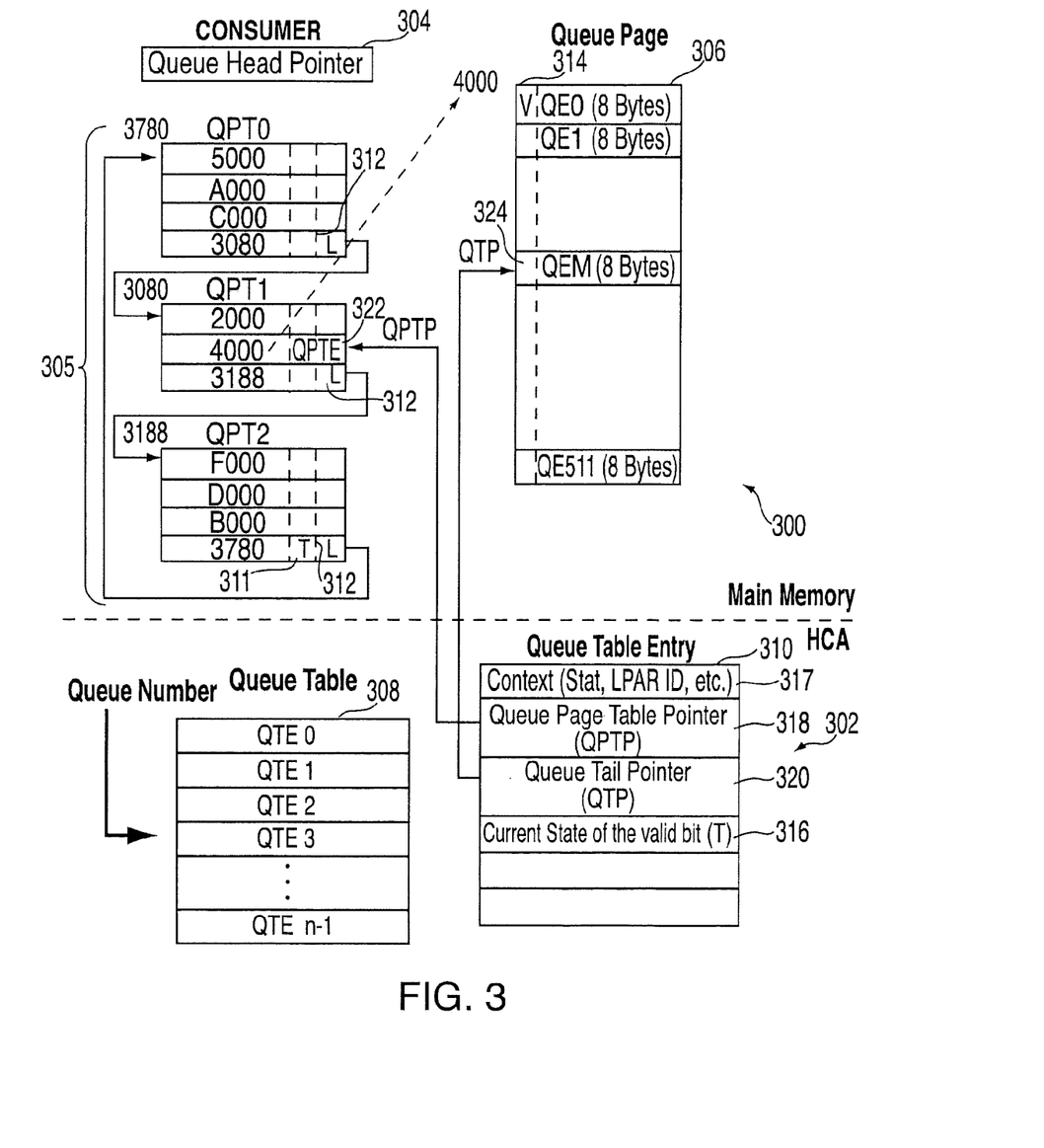
FIG. 3 is a block diagram showing a software consumer and hardware producer according to an exemplary embodiment of the present invention.

FIG. 3 shows a hardware producer 302 and a memory 300, according to an exemplary embodiment of the present invention. The hardware producer 302 is shown below the horizontal line in FIG. 3, while the memory 300 is shown above the horizontal line. The hardware producer 302 produces entries in one or more queues and a software consumer in memory 300 consumes entries from the queue(s). The software consumer in memory 300 is executed by a processor (not shown). The memory 300 is accessible by the processor.

The hardware producer 302 accesses memory 300 through direct memory access (DMA) writes, in this exemplary embodiment. The processor, through memory mapped I/O, writes registers in the hardware producer 302 to wake up the hardware producer 302. Because the information in a queue table 308 is frequently accessed, it is more efficient to store on the hardware producer 302 than in memory 300.

The hardware producer 302 is an HCA, in the exemplary embodiment shown in FIG. 3. The hardware producer 302 indexes into the queue table 308 using a queue number. The queue table 308 has multiple queue table entries (QTEs) 310, which are shown in FIG. 3 as QTE0, QTE1, QTE2, etc. Each QTE 310 holds a context 317, a queue page table pointer (QPTP) 318, a queue tail pointer (QTP) 320, and a current state of the valid bit 316. The context 317 includes the control information related to the queue, such as a state and LPAR identifier (ID), and other control information. The QPTP 318 and QTP 320 point to locations in memory 300.

The QPTP 318 points to a current queue page table entry (QPTE) 322 in QPT1, which is one of the queue page tables (QPTs) 305. The hardware producer 302 uses the QPTE 322 to locate the current queue page 306 in memory 300. In the example in FIG. 3, the current queue page 306 is at address 4000.

The QTP 320 points to a current queue entry (QE) 324 in a queue page 306. The QTP points to the location in memory 300 where the hardware producer 302 will place the next queue entry. The software consumer consumes entries at the head of the queue, which is pointed to by the queue head pointer 304.

The memory 300 may be user space, kernel space, hypervisor space, or any combination thereof. Memory 300 holds queue page tables (QPTs) 305, and queue pages, such as queue page 306. Memory 300 may hold multiple queues, each queue being locatable by the hardware producer 302 through the queue table 308. In one embodiment, the queue table 308 is stored in static random access memory (RAM) on the hardware producer 302. In another embodiment, the queue table 308 is in memory 300.

User or kernel space 304 may be owned by either a user process or a supervisor. Kernel space is a more protected space in memory 300 than a user process, which has a low level privilege. Only a supervisor of an operating system owns the kernel space 304, in this exemplary embodiment. Either user or kernel space 304 includes a queue head pointer 304, which points to the head of a queue.

The QPT 305 is a series of tables having any number of queue page table entries (QPTEs), typically each of these tables is limited to 4K pages. Each entry in each QPT 305 points to a queue page 306. For example, the queue page 306 is indicated by QPTE 322 in QPT1 as being located at 4000 in FIG. 3. Of course, the present invention is not limited to any particular size or addressing scheme.

A number of QPTs 305 are linked together in a list for pointing to the location of the queue. Typically, the list of QPTs 305 is circular and the last entry points back to the beginning of the list. In the exemplary embodiment shown in FIG. 3, there are three QPTs 305, namely QPT0, QPT1, and QPT2. These QPTs 305 are linked by the links (L) 312 in the last entry of each QPT 305. The link 312 in QPT0 points to QPT1, which in turn points to QPT2, which in turn points to QPT0.

Queue page 306 is at address 4000, in this exemplary embodiment, as pointed to by queue page table entry (QPTE) 322. Queue pages 306 are typically 4096 bytes each, but can be of any size. The queue pages 306 may be located anywhere in memory 300. The location of each queue page 306 is specified by a Queue Page Table Entry (QPTE) 322 in a QPT 305. In the exemplary embodiment in FIG. 3, the queue page 306 has 512 queue entries (QE). Queue page 306 has QEs={QE0, QE1, ... QEM ... QE511}. The current QE 324 is locatable by the hardware producer 302 through the QTP 320.

The validity of each QE 324 in the queue page 306 is indicated by a validity bit (V) 314. The software consumer checks the validity bit 314 before consuming a QE and may poll the validity bit to wait until the hardware producer posts a valid QE there. The polarity of the validity bit 314 is controlled by a toggle bit (T) 311 in the QPTEs, illustrated in QPTE 3780 in QPT2 next to the link 312 in FIG. 3. In this exemplary embodiment, the toggle bit 311 is on only if the link bit 312 is on, toggling at the end of the queue. In this way, after the software consumer consumes a QE, the software consumer need not invalidate the QE, even though the queue is circular and, thus, wraps around. Unlike the hardware producer 302, the software consumer is aware of the queue structures in memory 300, because the software consumer initializes the queue structures. The hardware producer 302 simply posts the next QE wherever it is located, toggling as instructed.

There is a toggle bit 311 in each QPTE 322 for indicating whether to toggle the validity bit upon moving to the next queue page 306 in this exemplary embodiment. The hardware producer 302 toggles the value of the valid bit 314 in posting QEs 324 to the queue in order to eliminate the need to write over the valid bit 314 to make the QE 324 invalid. Suppose the software consumer initialized every QE to "0", including valid bits 314 and suppose the current state of the valid bit 316 in the queue table entry 310 is initialized to "1". The hardware producer 302 initially sets the valid bit 314 to "1" when it posts a valid QE 324 to the queue, because the current state of the valid bit 316 in the queue table entry 310 is "1". In this case, the software consumer does not consume a QE 324 having a valid bit of "0" (invalid) and only consumes a QE 324 having a valid bit of "1" (valid). When the hardware producer 302 reads a toggle bit 311 in a QPTE 322 that directs it to toggle the validity bits 314, then the hardware producer 302 begins to set the valid bit 314 to "0" when it posts a valid QE 324 to the queue. Also at this time, the current state of the valid bit 316 in the queue table entry 310 of the hardware producer 302 is set to "0". Now after the toggling, the software consumer will not consume a QE having a valid bit of "1" (invalid) and will only consume a QE 324 having a valid bit of "0" (valid).

Figure 4:
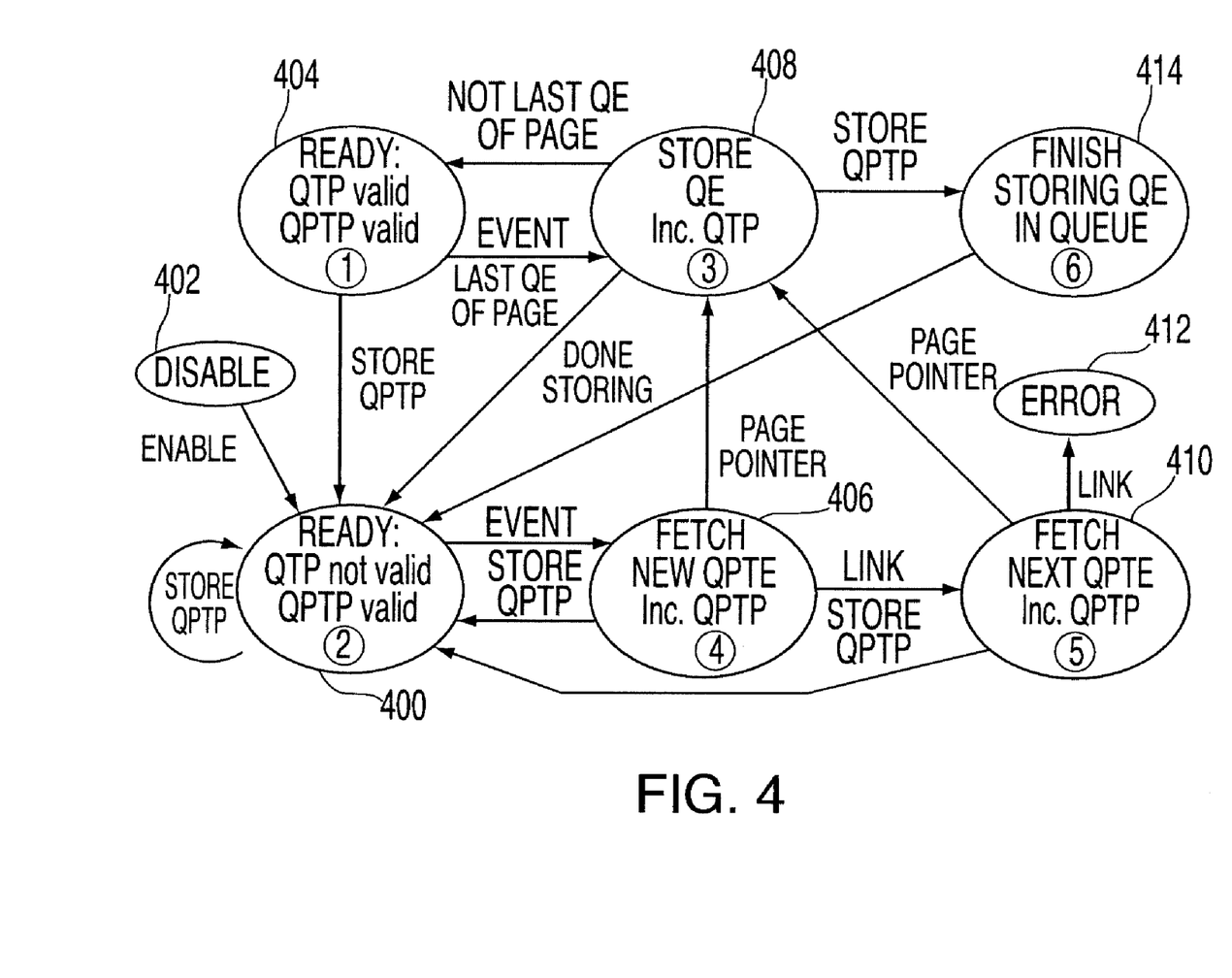
FIG. 4 is a state diagram showing the operation of the queue of FIG. 3 according to an exemplary embodiment of the present invention.

FIG. 4 shows the state transitions of the queue from the perspective of the hardware producer 302 according to an exemplary embodiment of the present invention. If there are multiple queues, there is a current state for each queue independently. The queue state is stored in the context 317 (FIG. 3). There are six states in FIG. 4, which are defined in Table 1, below.

TABLE 1

Queue State Definition

| Queue State | State Name | QPTP (0:60) |
|---|---|---|
| 1 | READY: QTP VALID, QPTP VALID | Points to current QPTE |
| 2 | READY: QTP NOT VALID, QPTP VALID | Points to current QPTE |
| 3 | STORE QE | Points to current QPTE |
| 4 | FETCH NEW QPTE | Points to last or new QPTE |
| 5 | FETCH NEXT QPTE | Points to last or new QPTE |
| 6 | FINISH STORING QE IN QUEUE | Points to new QPTE |

Sometimes the QTP 305 is valid and other times it is not valid. The same is true for the QPTP 318. Referring to FIG. 3, when the hardware producer 302 is at the end of a queue page 306, the QTP 320 is not valid, so the hardware producer 302 fetches the next QPTE 306 in the QPT 305 and loads the QTP 320. When the hardware producer 302 is at the end of a QPT 305, the QPTP 318 is not valid, so the hardware producer 302 increments the QPTP 318 and follows the link 312 to fetch the next QPTE at 3188. Also, when the QPTP register is rewritten in the hardware producer 302, the QPTP is not valid anymore. This might occur during a move and/or resize operation.

An event is something to post to a queue. Some examples of events include an error in a work queue, a completion queue transitions from an empty to a non-empty state, notice of a message on a link, and an event in an event queue. Typically, the order or sequence of events is important.

In FIG. 4, the hardware producer 302 does not fetch the new QPTE value to initialize and/or update the QTP, until an event is detected, causing the hardware producer 302 to store a QE. In one embodiment, the hardware producer 302 prefetches the QPTE value whenever the QTP is not valid.

Once the software consumer initializes and enables the queue, the queue enters state two 400. A memory mapped I/O (MMIO) store to the QPTP register may be done either before or after the queue is moved from a disabled state 402 to state two 400. In one embodiment, the QPTP is initialized by the software consumer in memory 300, before the queue is moved from the disabled state 402 to state two 400. The queue does not fetch the first QPTE. In one embodiment, the hardware producer 302 fetches the first QPTE and the queue enters state one 404. However, in this exemplary embodiment, the QPTP points to the doubleword in memory 300 from where the QPTE will be fetched, when there is an event.

When there is an event and the queue is in state two 400, the queue moves to state four 406. In state four 406, the QPTE is fetched and the QPTP incremented. If the QPTE is a page pointer, the queue moves to state three 408, where the QE is stored and the QTP is incremented. If the QE was the last in the page, the queue returns to state two 400. Otherwise, the queue moves to state one 404 to be ready to store the next QE.

In state four 406, when a link (L) 312 is fetched, the content of the QPTE (the link 312) is used to fetch the next QPTE and the QPTP is incremented and the queue moves to state five 410. If this QPTE is another link 312, the hardware producer 302 goes to an error state 412 and stores the QE.

At any time, the hardware producer 302 may receive a MMIO store to the QPTP register. The new value of the QPTP is stored, and the following actions are taken:

A valid value used in the QEs is set to one.

If the queue is in state one 404, the queue transitions to state two 400.

If the queue is in state two 400, the queue stays in state two 400.

If the queue is in state three 408, the queue moves to the final state, state six 414, where the hardware producer 302 finishes storing the QE into the queue and then the queue transitions to state two 400. The valid value in the QE is from the current valid value of the old queue (not necessarily one).

If the queue is in state four 406, the hardware producer 302 finishes fetching the QPTE and the queue transitions to state two 400 from where the event causes another transition to state four 406.

If the queue is in state five 410, the hardware producer 302 finishes fetching the QPTP and the queue transitions to state two 400, from where the event causes another transition to state four 406.

If the queue is in state six 414, the queue stays in state six 414 where the hardware producer 302 finishes storing the QE into the present QE and, then, the queue transitions to state two 400.

In an exemplary embodiment, typical operation may be as follows. Starting in state one 404, when an event occurs, there is a transition to state 3 to store the QE and increment the QTP to point to the next empty slot. Then, if it is not the last entry of the queue page, there is a transition back to state one 404. While the hardware producer is receiving events and storing them during normal operation, the state transitions from state one 404 to state three 408 and back again like this. Eventually, the last QE of the page is reached, and there is a transition to state two 400. In state two 400, the hardware producer 302 stores the next QPTP and then waits for another event. When the event occurs, there is a transition to state four 406. In state four 406, the hardware producer stores the next QPTE and increments the QPTP, which gives the hardware producer its new page pointer and there is a transition back up to state three 408 to store the QE and then back to state one 404. There is a transition between states four 406 and five 410 when the link bit is on. The hardware producer 302 fetches the next QPTP and if it is still a link, that is an error 412, because if hardware producer 302 fetched the link and got a link hardware producer 302 may be in an infinite loop. Otherwise, the hardware producer has its new page pointer and transitions back to state three 408.

During a move and/or resize operation in the exemplary embodiment, the software consumer stores a new QPTP to a register in the hardware producer 302 and notifies the hardware producer 302. This store QPTP may occur in state one 404, state two 400, state three 408, state four 406, or state five 410. If the hardware producer 302 was in the process of storing a QE in state three 408, it needs to be guaranteed that it completes in state six 414. This may be performed differently on different processors. For example, a store instruction may be followed by a load instruction to verify that the store completed, because the load instruction is synchronous.

Figure 5:
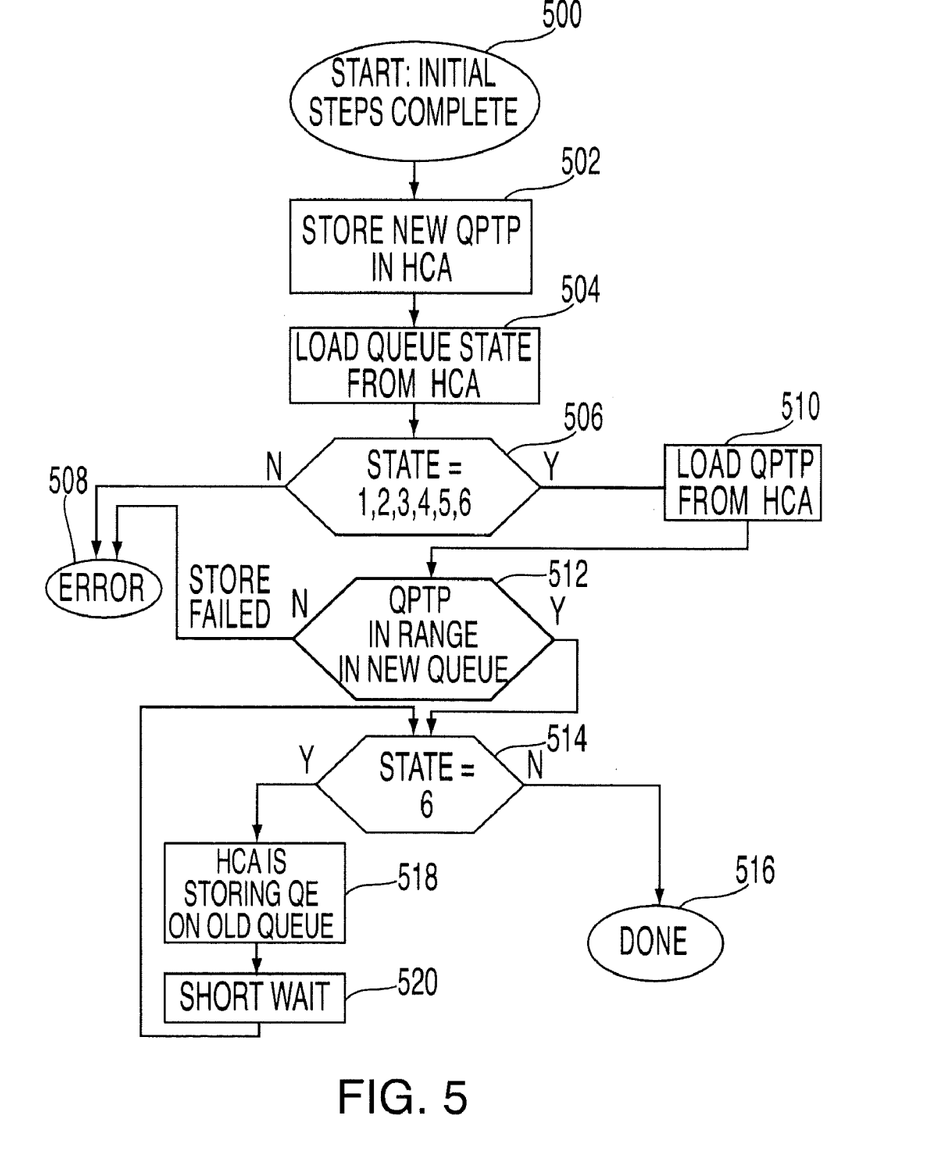
FIG. 5 is a flowchart showing how the queue of FIG. 3 is moved and/or resized according to an exemplary embodiment of the present invention.

FIG. 5 shows how the queue is moved and/or resized according to an exemplary embodiment of the present invention, where the hardware producer 302 is an HCA having a HCA driver (HCAD). Initialization is performed at 500 for the new queue, including setting up tables, indices, and the like. Then, the new QPTP is stored in the HCA at 502. The queue state is loaded from the HCA at 504 and it is determined whether the queue state is 1, 2, 3, 4, 5, or 6. In all of these states, the HCA will not put any more entries on the old queue. If not, there is an error 508 and the store failed. Otherwise, the QPTP is loaded from the HCA at 510. If the QPTP is in range in the new queue at 512, then it is determined whether the queue state is state 6. If so, the HCA is storing a QE on the old queue at 518 and a short wait is introduced 520 to allow the HCA to complete the store before checking again whether the queue state is state 6 at 514. Otherwise, the process is done at 516. At this point, no events will be posted to the old queue.

In an exemplary embodiment, in order to initialize the new queue at 500, the HCAD creates a new set of QPTs and queue pages. The HCAD retrieves one or more pages for the new QPTs and queue pages and pins them. The HCAD initializes the new QPTs and the new queue pages by setting valid bits to zero. The HCAD stores the new QPTP into the HCA. At this point, the HCAD has effectively committed the move and/or resize operation and the initial steps are complete.

If the queue is resized larger, additional QPs, CQs, PTs, and the like can then reference the larger queue. After emptying the old queue, the memory resources can be reclaimed.

Figure 6:
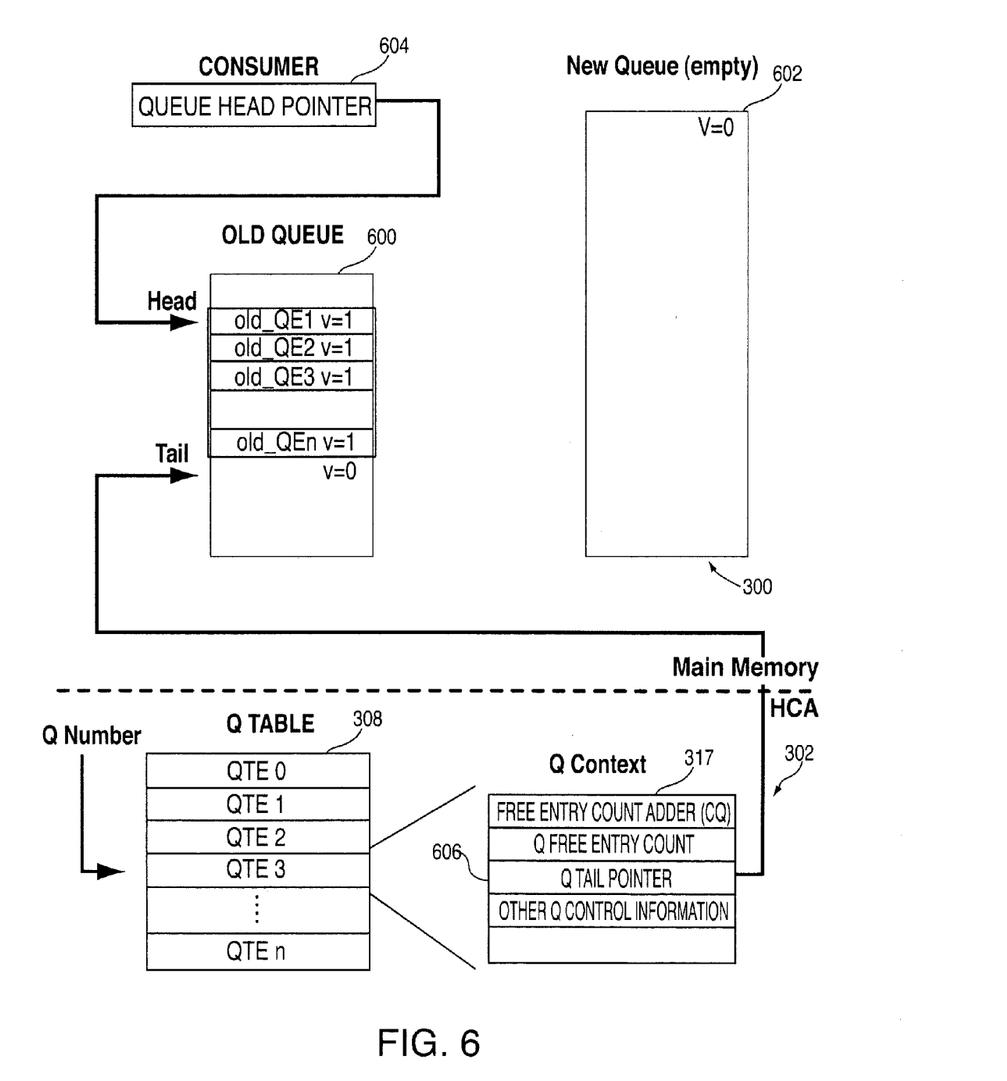
FIG. 6 is a block diagram showing an old queue in an initial state before it is moved according to an exemplary embodiment of the present invention.

FIG. 6 shows an old queue 600 in an initial state before it is moved to a new queue 602 according to an exemplary embodiment of the present invention. A software consumer in memory 300 holds a queue head pointer 604 that points to the head of the old queue 600. The hardware producer 302, such as an HCA holds a QTP 606 in a queue context 608 that points to the tail of the old queue 600. There is a queue context 608 for each queue in the queue table 308.

The software consumer in memory 300 builds a new queue 602 by allocating a portion of memory 300, which may be larger, smaller, or the same size as the old queue 600. Initially, the new queue 602 is empty as indicated by a valid bit in each entry being set to an invalid state and by the head and tail pointer pointing to the same entry in the new queue 602. Initially, the old queue 600 remains operational as shown in FIG. 6, even though the old queue is about to be moved. The QTP 606 is to point to the new queue 602, when the hardware producer 302 attempts to use the QTP 606 pointing to the old queue, but discovers that it is no longer valid. Then, the hardware producer 302 retrieves a new value for the QTP 606, which points to the new queue 602. The software consumer retrieves entries from the head of the old queue 600 using the queue head pointer 604 and the hardware producer 302 posts new entries to the tail of the new queue 602 using the QTP 606, as shown in FIG. 7.

One of the advantages this exemplary embodiment is that entries in the old queue 600, if any, are not copied to the new queue 602. This would introduce synchronization problems and is not necessary. Instead, the software consumer builds a new queue which the hardware producer 302 begins to use, while the software consumer finishes consuming from the old queue 600. Once the software consumer has finished, the old queue may be reclaimed and reused by memory 300. Determining what entries on the old and new queues 600, 602 are valid is preferable to potential synchronization problems and potentially losing or duplicating entries. While a move and/or resize is occurring, the hardware producer 302 need not be stopped from posting entries. There is no need for any event or synchronization to trigger moving from the old queue 600 to the new queue 602. The new queue 602 is created as needed, without regard to any event, such as whether the hardware producer 302 needs to post an entry or not and without any timers, waits, or synchronization. There are a large number of scenarios when it might be useful to move and/or resize a queue. For example, a hypervisor may instruct hardware to move the queue for dynamic memory migration.

FIG. 6 shows some of the same information in FIG. 3, however the indirection of the QPT 305 is eliminated and the queues are shown conceptually rather than as linked queue pages. In FIG. 6, the old queue 600 has some entries and the new queue 602 has been created. After the software consumer created the new queue 602, the software consumer requests that the hardware producer 302 not put any new entries on the old queue 600. At this point, the software consumer knows that once the last entry is used from the old queue 600, any new entries from the hardware producer 302 will be on the new queue 602.

Figure 7:
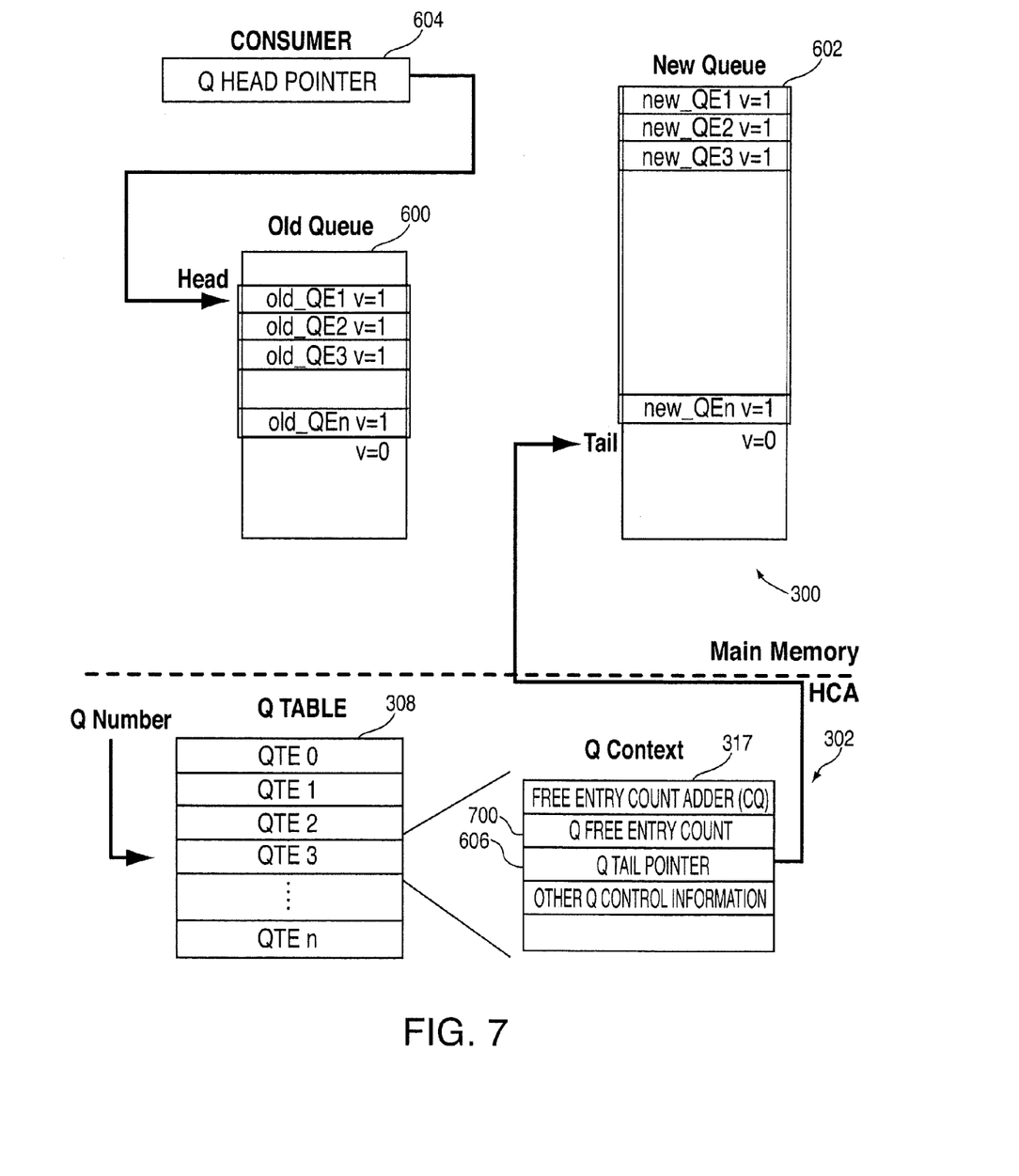
FIG. 7 is a block diagram showing the old queue and the new queue in an intermediate state according to an exemplary embodiment of the present invention.

FIG. 7 shows the old queue 600 and the new queue 602 in an intermediate state according to an exemplary embodiment of the present invention. The hardware producer 302, such as an HCA, is informed of the presence of the new queue 602 by an update of the QTP 606 in the queue context 608 with the location of the top of the new queue 602. Before proceeding, it is verified that this pointer update has completed successfully. The hardware producer 302 guarantees that all QEs written prior to this update are visible to the operating system before the pointer update is verified as being complete. If the old queue 600 is being resized larger, the number of available entries on the queue that is stored in the queue context 608 may be updated at this time by writing to the free entry count adder 700. In some embodiments, the fee entry count adder 700 is used with CQs and not with EQs. If the old queue 600 is being resized smaller, it is guaranteed that the new queue 602 will not overflow. Resizing smaller usually occurs when QPs are destroyed and, for CQs, it is ensured that there are no outstanding work completions for these QPs before the free entry count adder 700 is written to reduce the number of available entries on the CQ.

During the resize process, the queue number in the queue table 308 is unchanged. After the QTP 606 has been updated, the hardware producer 302 posts all new entries at the tail of the new queue 602. The software consumer in memory 300 continues to retrieve entries from the old queue 600 as referenced by the queue head pointer 604. This continues until the old queue 600 is determined to be empty, as indicated by a valid bit in the QE at the head of the old queue 600 being set to the invalid state.

Figure 8:
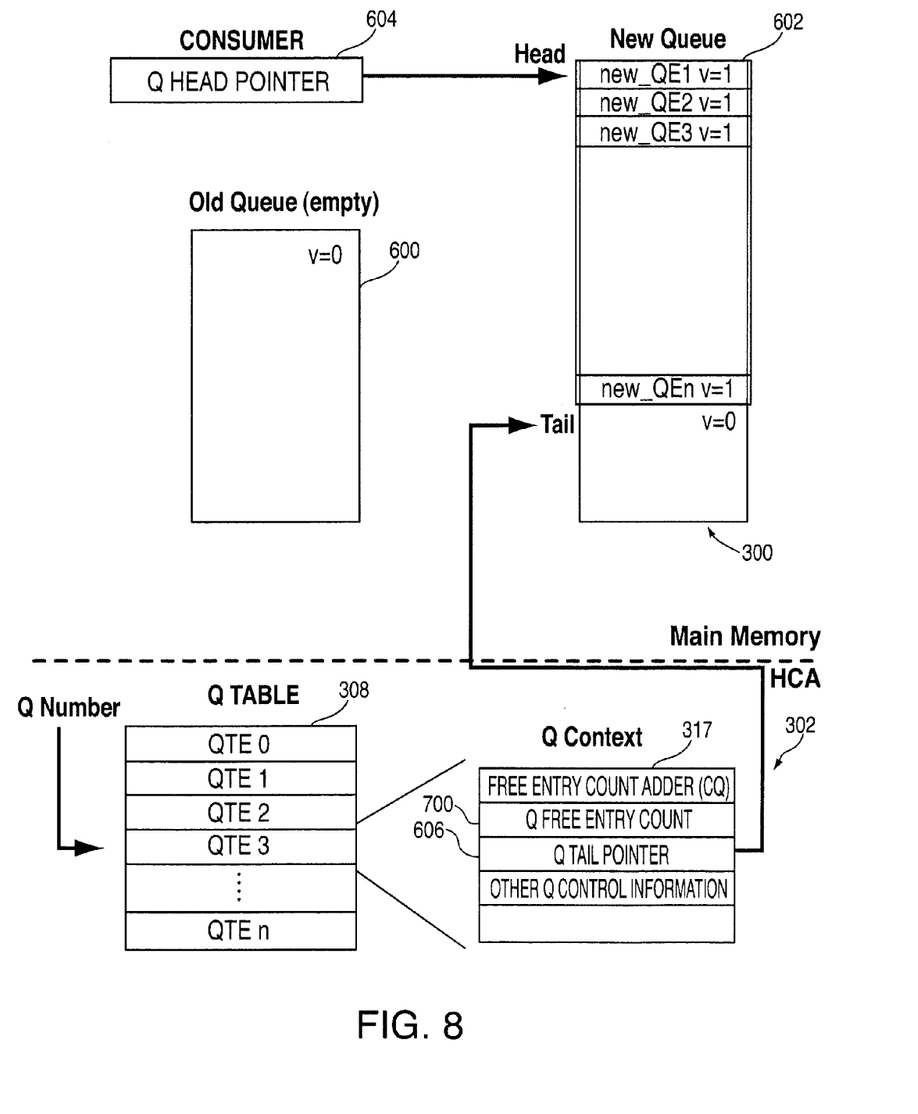
FIG. 8 is a block diagram showing the new queue in a final state after it has been moved and/or resized according to an exemplary embodiment of the present invention.

FIG. 8 shows the new queue 602 in a final state after it has been moved and/or resized according to an exemplary embodiment of the present invention. After the old queue 600 has been determined to be empty, all subsequent entries are retrieved from the new queue 602, so the software consumer's queue head pointer 604 is updated to reference the top of the new queue 602. The hardware producer 302 continues to post new entries to the tail of the new queue 602. At this point, the resources associated with the old queue 600 can be reclaimed and the move operation is complete.

In an exemplary embodiment, which is an InfiniBand™ compliant system, Completion Queues (CQs) 212 are used to inform the consumer 200 when a work request 206 has completed. Although not defined in the standard, Event Queues (EQs) can be used to inform the consumer 200 of numerous conditions such as posting completion events, state change events, and error events that are defined in the standard. Both of these queues may be dynamically resized, while work completions and events are outstanding and/or being posted. CQs may be resized when the number of queue pairs (QPs) referencing a particular CQ is changed, and EQs may be resized when the number of resources referencing a particular EQ is changed. Both queues may be resized either smaller or larger. Also, during memory management operations, these queues need to be physically moved from one area of memory to another, dynamically. In any type of system, producer-consumer queues may need to be moved and/or resized dynamically for memory management purposes.

Moved dynamically means that the queue is allowed to operate as it is being moved, and that the move can be completed without depending on any particular activity on the link beyond emptying entries at the old location. Other movement and resizing proposals require that the queue is stopped or quiesced during the move (requiring quiescing of many related resources), or require certain activities on the link (generation of the next new entry) before the move can complete and the old memory be reclaimed. Memory management operations are required to resize LPAR memory or to evacuate a node for concurrent node replacement. Both of these operations may require dynamic movement of a queue from one area of physical memory to another.

A mechanism for moving CQs and EQs creates a new queue of the required new size: larger, smaller, or the same size. When informed of this new queue, the HCA performs a series of operations to prepare to use the new queue after which it posts entries to the new queue. After the consumer has determined that the HCA has prepared the new queue and has retrieved all outstanding work completions from the old queue, the resources with the old queue may be reclaimed. Thereafter all entries are retrieved from the new queue.

While the invention has been described with reference to exemplary embodiments, it will be understood by those skilled in the art that various changes may be made and equivalents may be substituted for elements thereof without departing from the scope of the invention. For example, any type of producer-consumer system may benefit from the present invention, regardless of whether it is in an InfiniBand™ compliant system. In addition, many modifications may be made to adapt a particular situation or material to the teachings of the invention without departing from the essential scope thereof. Therefore, it is intended that the invention is not to be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-implemented method for moving a queue, the computer comprising a computer processor, a computer memory operatively coupled to the computer processor, the computer memory having disposed within it computer program instructions capable of executing the method, the method comprising:

storing a queue page table pointer to a hardware producer that points to a location of a new queue;

determining a current state of the hardware producer; and if the current state is a final state, the hardware producer finishes storing a queue event in an old queue and the current state transitions to a second state having a ready condition, an invalid queue tail pointer, and a valid queue page table pointer, the valid queue page table pointer being the queue page table pointer that points to the location of the new queue;

if the current state is a first state having a ready condition, a valid queue tail pointer, and the valid queue page table pointer, then the current state transitions to the second state;

if the current state is the second state, then the current state remains the second state;

if the current state is a third state having a store queue event condition, the current state transitions to the final state, the hardware producer finishes storing the queue event in the old queue and the current state transitions to the second state; and wherein if the current state is a fourth state having a fetch queue page table entry condition, the hardware producer finishes fetching a queue page table entry and the current state transitions to the second state from which the queue event causes the current state to transition to the fourth state.

2. The method of claim 1, further comprising: if the current state is a fifth state having a fetch next queue page table pointer condition, the hardware producer finishes fetching the queue page table pointer and the current state transitions to the second state from which the queue event causes the current state to transition to the fourth state.

* * * * *